(12) United States Patent
Park et al.

(10) Patent No.: US 10,480,661 B2
(45) Date of Patent: Nov. 19, 2019

(54) LEAK RATE REDUCING SEALING DEVICE

(71) Applicants: Doseo Park, Houston, TX (US); Zhi Yong HE, Cypress, TX (US)

(72) Inventors: Doseo Park, Houston, TX (US); Zhi Yong HE, Cypress, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 95 days.

(21) Appl. No.: 15/696,343

(22) Filed: Sep. 6, 2017

(65) Prior Publication Data

US 2019/0072187 A1    Mar. 7, 2019

(51) Int. Cl.
*F16K 1/42* (2006.01)
*F16K 1/14* (2006.01)
*E21B 34/10* (2006.01)
*E21B 34/00* (2006.01)

(52) U.S. Cl.
CPC ............... *F16K 1/42* (2013.01); *E21B 34/10* (2013.01); *F16K 1/14* (2013.01)

(58) Field of Classification Search
CPC ... F16K 1/42; F16K 1/14; F16K 15/04; F16K 15/044; F16K 15/046; E21B 34/10; E21B 34/00; E21B 2034/002
USPC ................... 251/123, 333, 334, 359
See application file for complete search history.

(56) References Cited

U.S. PATENT DOCUMENTS 1,560,235 A * 11/1925 Hinsch .................. F01L 3/20
                                                    123/188.1
1,679,779 A * 8/1928 Oberhuber ............... F16K 1/36
                                                    110/104 R
1,839,310 A    1/1932 Hatcher
2,250,813 A * 7/1941 Rea ........................ F16K 1/14
                                                    251/358
2,481,713 A * 9/1949 Bertea ................... F16K 15/044
                                                    137/515.5

(Continued)

FOREIGN PATENT DOCUMENTS

WO        02093284 A1    11/2002

OTHER PUBLICATIONS

"Circular Seal/Rod/Metal/Corrugated—6807 G"; Texpack Corrugated Seal; 2017; Retrieved from Internet; URL: http://www.directindustry.com/prod/texpack/product-13172-1562283.html; 2 Pages.

(Continued)

*Primary Examiner* — Mary E McManmon
*Assistant Examiner* — David Colon-Morales
(74) *Attorney, Agent, or Firm* — Cantor Colburn LLP

(57) ABSTRACT

A sealing assembly includes a flow control body and a sealing device configured to engage the flow control body to prevent fluid flow through the sealing assembly. The sealing device includes a primary engagement feature configured to contact the flow control body upon engagement of the sealing device with the flow control body, the primary engagement feature having a front surface exposed to the fluid, and a secondary engagement feature disposed behind the primary engagement feature relative to the exposed surface, the primary engagement feature and the secondary engagement feature forming a cavity therebetween, the cavity configured to create a pressure drop in response to a leak of the fluid through the primary engagement feature.

18 Claims, 4 Drawing Sheets

(56) References Cited

U.S. PATENT DOCUMENTS

| | | | | |
|---|---|---|---|---|
| 2,676,782 A * | 4/1954 | Bostock | ............... | F16K 1/14 137/467 |
| 3,054,422 A * | 9/1962 | Napolitano | ............ | F16K 1/385 137/509 |
| 3,077,896 A * | 2/1963 | Weingard | ............... | F16K 1/14 137/329.06 |
| 4,124,195 A * | 11/1978 | Braun | ............... | F16K 1/42 251/333 |
| 4,175,619 A | 11/1979 | Davis | | |
| 4,190,111 A | 2/1980 | Davis | | |
| 4,589,495 A * | 5/1986 | Langer | ............... | E21B 21/10 166/155 |
| 5,107,890 A * | 4/1992 | Gute | ............... | F16K 15/044 137/539 |
| 5,127,472 A | 7/1992 | Watson et al. | | |
| 5,146,992 A * | 9/1992 | Baugh | ............... | E21B 23/08 166/154 |
| 5,340,125 A * | 8/1994 | Brown | ............... | F16L 17/025 277/558 |
| 5,893,389 A * | 4/1999 | Cunningham | ........ | F16K 15/063 137/516.27 |
| 5,921,473 A * | 7/1999 | Romann | ............ | F02M 51/0657 239/533.2 |
| 5,960,881 A * | 10/1999 | Allamon | ............ | E21B 21/103 166/285 |
| 6,105,610 A * | 8/2000 | Watkins, II | ............ | F16K 15/04 137/516.29 |
| 6,135,523 A | 10/2000 | Pratt | | |
| 6,491,103 B2 | 12/2002 | Allamon et al. | | |
| 6,651,693 B2 * | 11/2003 | Simmons | ............... | F16K 15/04 137/329.05 |
| 6,880,639 B2 * | 4/2005 | Rhodes | ............... | E21B 34/08 166/321 |
| 7,225,831 B2 * | 6/2007 | Hope | ............... | F16K 15/025 137/516.27 |
| 7,311,118 B2 * | 12/2007 | Doutt | ............... | F16K 15/044 137/15.18 |
| 7,549,485 B2 | 6/2009 | Radford et al. | | |
| 7,644,772 B2 | 1/2010 | Avant et al. | | |
| 7,780,144 B2 * | 8/2010 | Van Der Linden | ............... | F02M 59/462 137/539 |
| 7,931,252 B2 * | 4/2011 | Shindo | ............... | F16K 1/34 251/318 |
| 8,365,829 B2 | 2/2013 | Kellner et al. | | |
| 8,668,006 B2 * | 3/2014 | Xu | ............... | E21B 33/12 166/192 |
| 8,695,710 B2 * | 4/2014 | Howell | ............... | E21B 34/108 166/334.1 |
| 8,763,706 B2 * | 7/2014 | Lembcke | ............... | E21B 43/123 166/325 |
| 9,115,814 B2 * | 8/2015 | Sun | ............... | F16K 1/42 |
| 9,488,035 B2 | 11/2016 | Crowley et al. | | |
| 9,617,812 B2 | 4/2017 | Lee | | |
| 9,797,519 B2 * | 10/2017 | Gyger | ............... | F16K 1/42 |
| 2001/0032675 A1 * | 10/2001 | Russell | ............... | F16K 17/18 137/493.9 |
| 2005/0012063 A1 * | 1/2005 | Thompson | ............... | F16K 41/14 251/214 |
| 2005/0029483 A1 | 2/2005 | Bancroft et al. | | |
| 2005/0061372 A1 * | 3/2005 | McGrath | ............... | F02M 69/465 137/539.5 |
| 2007/0045587 A1 | 3/2007 | Kolenc et al. | | |
| 2009/0044955 A1 * | 2/2009 | King | ............... | E21B 34/14 166/374 |
| 2009/0308614 A1 * | 12/2009 | Sanchez | ............... | E21B 34/14 166/328 |
| 2009/0314979 A1 * | 12/2009 | McIntire | ............... | F04B 53/102 251/334 |
| 2011/0095222 A1 * | 4/2011 | Flores | ............... | B24B 15/00 251/359 |
| 2013/0068987 A1 | 3/2013 | Sun et al. | | |
| 2013/0180592 A1 * | 7/2013 | He | ............... | F16K 15/063 137/1 |
| 2014/0182855 A1 * | 7/2014 | Woodford | ............... | E21B 34/08 166/305.1 |
| 2015/0276065 A1 * | 10/2015 | Yoshida | ............... | F16K 1/34 251/333 |
| 2017/0306732 A1 * | 10/2017 | Beveridge | ............... | E21B 43/128 |
| 2018/0363416 A1 * | 12/2018 | Park | ............... | E21B 34/08 |

OTHER PUBLICATIONS

"Flat Seal/Flange/Metal/Corrugated", DONIT TESNIT, d.o.o.; 2017; Internet; URL: http://www.directindustry.com/prod/donit-tesnit-doo/product-62004-477148.html; 2 Pages.

"Metal Seal/Corrugated—Style 600—Garlock GmbH"; Garlock Corrugated Seal; 2017; Internet; URL: http://www.directindustry.com/prod/garlock-gmbh/product-5615-1315183.html; 2 Pages.

International Search Report for International Application No. PCT/US2018/049495, International Filing Date: Sep. 5, 2018, dated Dec. 26, 2018, 4 pgs.

* cited by examiner

LEAK RATE REDUCING SEALING DEVICE

BACKGROUND

In the energy industry, for example in hydrocarbon exploration and recovery operations, a variety of components and tools are lowered into a resource bearing region or formation. As such components are often exposed to extreme temperatures and pressure conditions, as well as various fluids and material that can cause corrosion or other damage, utilizing fluid seals that can withstand such conditions is important. Failure of sealing components can cause significant damage to components, as well as compromise the effectiveness of operations.

SUMMARY

An embodiment of a sealing assembly includes a flow control body and a sealing device configured to engage the flow control body to prevent fluid flow through the sealing assembly. The sealing device includes a primary engagement feature configured to contact the flow control body upon engagement of the sealing device with the flow control body, the primary engagement feature having a front surface exposed to the fluid, and a secondary engagement feature disposed behind the primary engagement feature relative to the exposed surface, the primary engagement feature and the secondary engagement feature forming a cavity therebetween, the cavity configured to create a pressure drop in response to a leak of the fluid through the primary engagement feature.

An embodiment of a method of controlling flow of a fluid via a sealing assembly includes engaging a flow control body of a sealing assembly with a sealing device of the sealing assembly to prevent fluid flow through the sealing assembly, the sealing device including a primary engagement feature configured to contact the flow control body upon engagement of the sealing device with the flow control body, the primary engagement feature having a front surface exposed to the fluid, the sealing device including a secondary engagement feature disposed behind the primary engagement feature relative to the exposed surface, the primary engagement feature and the secondary engagement feature forming a cavity therebetween. The method also includes injecting a fluid into a component and preventing flow of the fluid through the sealing assembly by the primary engagement feature, the fluid applying an external pressure to the primary engagement feature, and based on a leak of the fluid through the primary engagement feature into the cavity, causing a reduction of fluid pressure in the cavity relative to the external pressure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Devices and methods are provided for sealing components, such as components of energy industry systems. An embodiment of a sealing assembly includes a flow control body, such as a ball or dart, which is configured to engage a sealing device. The sealing device has a plurality of engagement features attached to or integral with the sealing device body. The plurality of engagement features include a primary engagement feature configured to prevent fluid flow through the sealing assembly and withstand external fluid pressure, and one or more secondary engagement features. The primary engagement feature is separated from one of the secondary engagement features by cavity into which fluid may flow in the event of a leak in the primary engagement feature. Fluid in the cavity has a pressure that is lower than the external fluid pressure, resulting in a pressure drop. The pressure drop can significantly reduce the leak rate or prevent further leakage in the event of a failure of the primary engagement feature.

Figure 1:
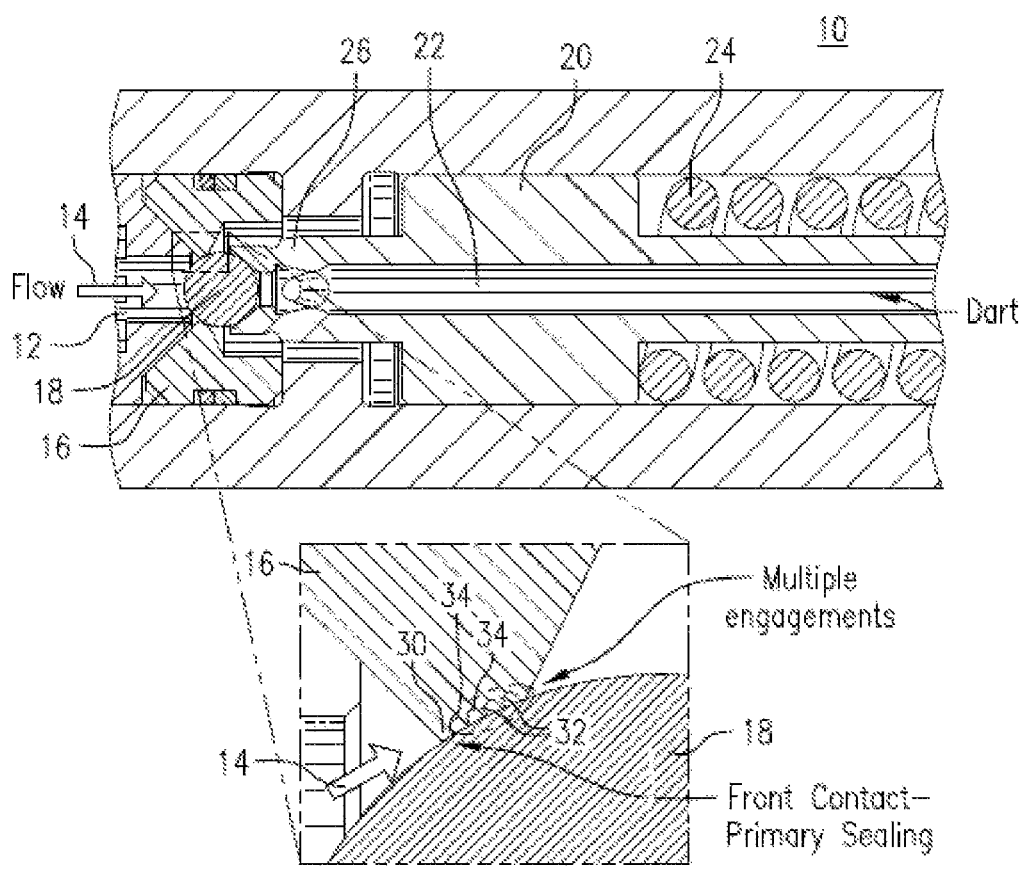
FIG. 1 depicts a valve assembly including an embodiment of a sealing assembly.

FIG. 1 shows aspects of an embodiment of a sealing assembly, which is incorporated into an injection valve assembly. The injection valve assembly can be incorporated into any suitable flow control device or system, such as a chemical injection system. The chemical injection system may be part of a system for recovering a target resource, such as hydrocarbons in a subterranean and/or subsea formation. For example, the sealing assembly can be part of a chemical injection system that is disposed with a borehole string, such as a drill string or production tubing configured to be disposed in a hydrocarbon bearing formation. Chemical injection is often used downhole to inject chemicals for purposes such as dissolving unwanted materials (e.g., scale, hydrates, paraffin and other undesirable solids) that can accumulate on downhole structures.

It is noted that, although embodiments are described in conjunction with a chemical injection system, they are not so limited. The sealing device described herein may be applicable to any downhole or surface system for which fluid sealing is desired.

In the embodiment of FIG. 1, the sealing assembly is part of a fluid injection system 10, which includes a valve assembly in fluid communication with an injection line 12, through which chemicals or other fluid 14 can be injected into a borehole region, formation or downhole component. The sealing device in this embodiment is a valve seat 16 to which a flow control body such as a ball 18 can be engaged to prevent fluid flow through the valve assembly.

The valve seat 16 is shaped to conform to the shape of the ball 18 and form a seal when the ball 18 is seated on the valve seat 16. For example, the valve seat 16 is a cylindrical body that forms an opening in the center of the cylindrical body. The center has a circular shape and a diameter that is selected so that the ball 18 sits in the valve seat 16 and is prevented from moving radially.

The valve assembly also includes a dart 20 or other component having a fluid conduit 22 into which fluid from the injection line 12 flows when the valve assembly is opened. In this embodiment, the dart 20 is biased in a longitudinal direction (i.e., a direction parallel to a longitudinal axis of the valve assembly) via a spring 24 to exert a force sufficient to keep the valve assembly closed when the fluid pressure in the injection line 12 (also referred to as an external pressure) is lower than a selected value, threshold or range. Thus, this embodiment represents a passive flow control device which can be opened by increasing the external pressure until the external pressure exceeds the biasing force. The valve assembly can also be an active flow control device that is actuated (e.g., mechanically, hydraulically or electrically) to open the valve assembly.

When the valve assembly is opened, the external pressure pushes the ball 18 and the dart 20 longitudinally away from the valve seat 16. Ports 26 are then open to the fluid flow and allow the fluid 14 to enter the fluid conduit 22 and be applied to a selected location or component.

In one embodiment, the valve seat 16 (or other sealing device) includes a plurality of engagement features configured to prevent or reduce fluid flow through the valve assembly. The engagement features include a primary engagement feature 30 that contacts the ball 18 and prevents fluid flow into the dart 20 or other conduit. The primary engagement feature 30 may serve exclusively or with other engagement features as a mechanical stop for the ball 18. The primary engagement feature 30 contacts a surface of the ball 16 and has a front surface that is exposed to fluid pressure in the injection line 12. If the fluid pressure is less than a threshold amount (e.g., in a passive valve system), the primary engagement feature 30 prevents fluid flow.

The plurality of engagement features also includes at least one secondary engagement feature 32 that is disposed behind the primary engagement feature, i.e., is disposed opposite the front surface. The secondary engagement feature 32 is separated from the primary engagement feature 30 by a first cavity 34. When the valve seat 16 is engaged with the ball 18, the first cavity is bounded by the primary engagement feature 30, the secondary engagement feature 32 and a surface of the ball 18.

In one embodiment, the valve seat body includes three or more engagement features that form respective cavities when the valve seat engages the ball 18. For example, as shown in FIG. 1, the valve seat 16 includes the primary engagement feature 30 and a plurality of successive secondary engagement features 32, each of which defines a respective cavity 34.

If the primary engagement feature 30 leaks, then fluid flows into the first cavity 34 and the fluid in the first cavity 34 has a lower pressure (at least for some initial period of time after the leak occurs). This reduction of pressure between fluid in the flow line and fluid in the first cavity 34 is referred to herein as a "pressure drop."

The first and second engagement features may be protrusions from the valve seat body, such as teeth or corrugations, and form the first cavity 34 as a recess between the protrusions. In the embodiment of FIG. 1, the protrusions extend circumferentially and form circumferential cavities.

The plurality of engagement features are configured so that a path formed by the engagement features conforms at least substantially to a shape of a surface of the flow control body. For example, the engagement features 30 and 32 are located on the valve seat body so that each engagement feature contacts a surface of the ball 18 when engaged.

Figure 4:
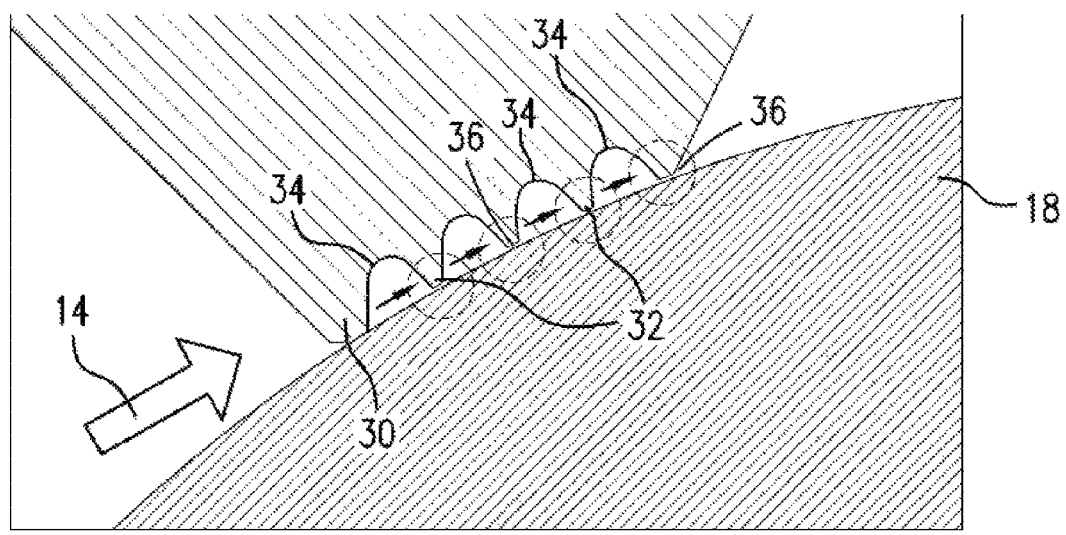
FIG. 4 depicts an embodiment of the sealing device of FIG. 1.

In another example, the engagement features are configured so that when the primary engagement feature 30 is in contact with the ball and maintaining a seal, there is a gap 36 between one or more of the successive secondary engagement features 32 and the ball 18, as shown in FIG. 4. For example, the secondary engagement features 32 have dimensions that result in a gap having a thickness of about 0.005 inches. All of the secondary engagement features 32 may have the same gap, different secondary engagement features 32 may have different size gaps, or some may be in contact while others have gaps. In addition, one or more of the gaps can be selected so that deformation of the primary engagement feature 30 causes a secondary engagement feature 32 to move closer to and/or come into contact with the ball 18.

Figure 2:
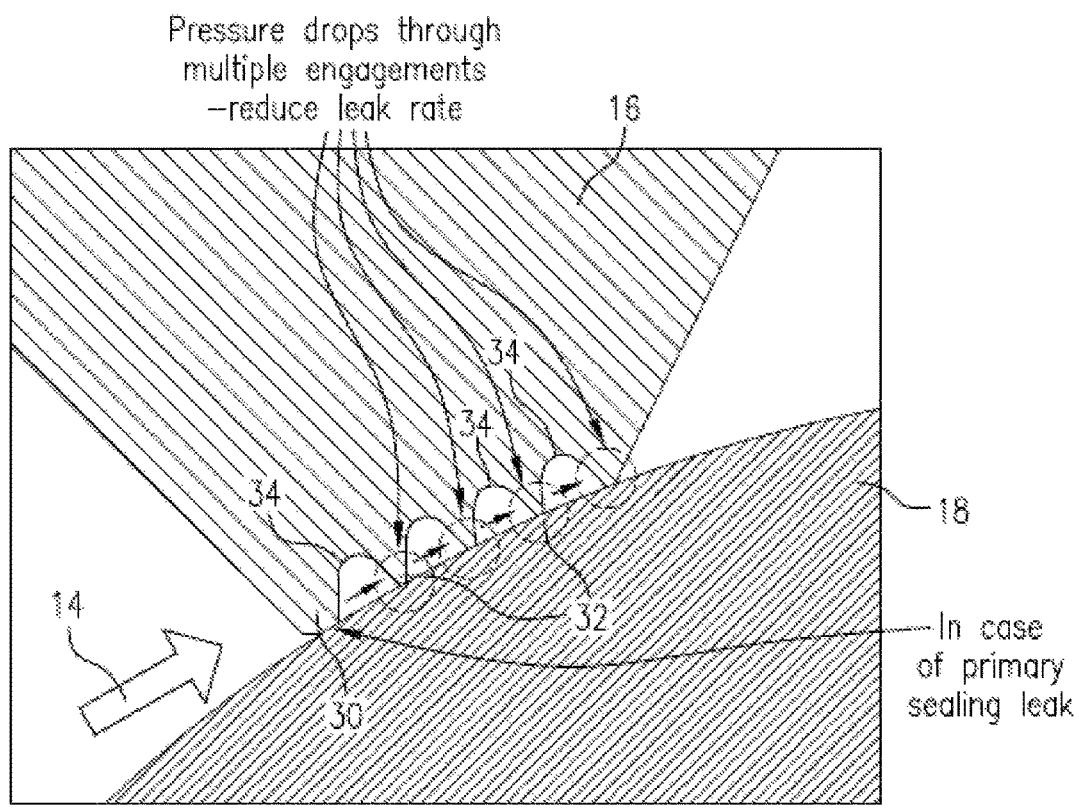
FIG. 2 is an expanded view of the sealing device of FIG. 1.

FIG. 2 illustrates fluid flow through cavities between the valve seat 16 and the ball 18 in the event of failure of the primary engagement feature 30. As shown, the fluid 14 flows into the first cavity 34 through a restricted opening (caused by, e.g., damage or corrosion) between the primary engagement feature 30 and the ball 18, and increases in velocity with an associated drop in pressure as the fluid flows into the first cavity 34. If the next secondary engagement feature leaks or has a pre-designed gap, fluid flows into the next cavity with another drop in pressure. In this way, if the primary engagement feature 30 fails, further leakage can be prevented or at least the rate of leakage can be slowed as compared to a seal that does not have the cavity or cavities.

Although each cavity 34 is shown in FIG. 2 has having at least approximately the same size, the sealing assembly is not so limited. The cavities 34 may have the same or different sizes or volumes. For example, the cavities 34 may be formed to have successively larger volumes.

In one embodiment, the primary engagement feature 30 is designed to be able to withstand a higher contract stress than one or more of the secondary engagement features 32. For example, as shown in FIG. 2, the primary engagement feature 30 has a greater thickness and/or contact area than the secondary engagement features 32.

The engagement features may be made from a single material or single type of material. For example, the valve seat body and the engagement features are made from a metal (e.g., aluminum or steel) or metal allow. In one embodiment, the engagement features are made from a different material than the rest of the valve seat body, or the engagement features themselves may be made from multiple materials.

Figure 5:
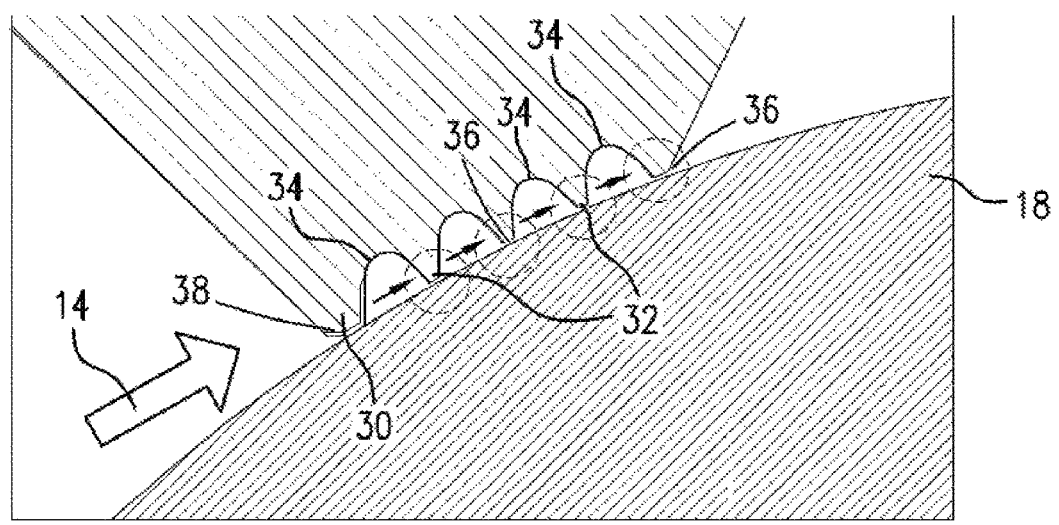
FIG. 5 depicts an embodiment of the sealing device of FIG. 1.

For example, the primary engagement feature 30 can be a metallic feature having a polymeric or thermoplastic coating 38, as shown in FIG. 5, which can have any desired thickness. The secondary engagement feature 32 may be configured to have a gap 36 between the secondary engagement feature 32 and the ball 18 when the coated primary engagement feature 30 contacts or engages the ball 18. The thickness of the coating 38 may be substantially the same as, or similar to, the thickness of the gap 36, so that if the coating 38 is removed due to, e.g., wear or damage, the gap 36 is reduced or eliminated and the secondary engagement feature 32 comes into contact with the ball 18.

In one embodiment, the sealing assembly is configured as part of a chemical injection system for use with one or more downhole components, such as a drill string, production tubing, downhole tools and others. For example, the valve assembly is a chemical injection valve disposed in the wall of a tubular such as a drill string or production tubing.

Figure 3:
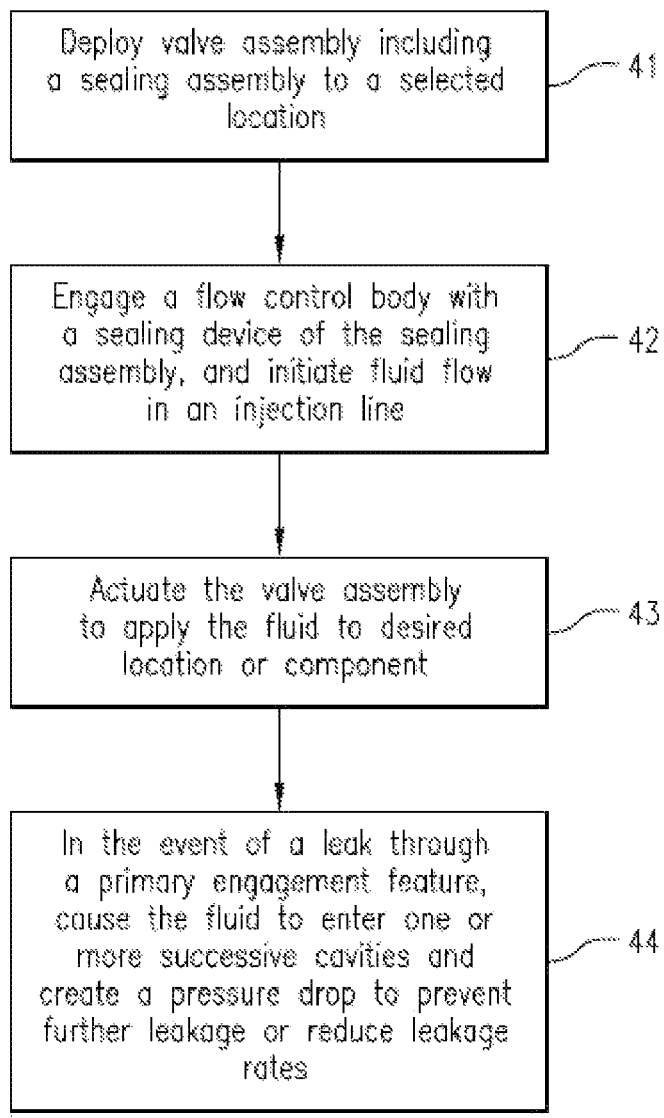
FIG. 3 is a flow diagram s rating a method of forming and maintaining a fluid seal.

FIG. 3 illustrates a method 40 of controlling fluid flow by a valve assembly and sealing assembly. The method 40 includes one or more stages 41-43. Although the method 40 is described in conjunction with the fluid injection system 10, the method 40 can be utilized in conjunction with any device or system (configured for downhole or surface use) that utilizes a fluid sealing assembly.

In the first stage 41, a valve assembly is deployed to a selected location for use as part of a fluid injection system. For example, the valve assembly is deployed in a downhole component (e.g., in the wall of a tubular or attached to the tubular).

In the second stage 42, a flow control body is engaged with a sealing device to prevent fluid flow through the valve assembly. For example, the ball 18 is seated against the valve seat 16 and held against the valve seat by a biasing device such as the dart 20. Fluid may then be injected into the injection line 12.

In the third stage 43, the valve assembly can be actuated to allow fluid flow therethrough and apply the fluid to a desired location or component. For example, the pressure of the fluid 14 in the injection line 12 is increased to exert a force against the ball 18 that is greater than the biasing force of the spring 24.

In the fourth stage 44, in the event of a leak, fluid flows through a restricted passage in a primary engagement feature into a cavity formed by the primary engagement feature and a secondary engagement feature. A leak may occur due to various conditions, such as mechanical damage to the ball 18 or the valve seat 16, or corrosion. For example, in chemical injection application where high cracking pressure and high temperatures are experienced, metallic and other seal materials can leak due to microscopic damage of seal surfaces. As discussed above, flow of the fluid into one or more successive cavities results in a pressure drop that assists in reducing the leakage rate and/or allowing secondary engagement features to prevent further leakage.

Set forth below are some embodiments of the foregoing disclosure:

Embodiment 1

A sealing assembly including a flow control body and a sealing device configured to engage the flow control body to prevent fluid flow through the sealing assembly, the sealing device including a primary engagement feature configured to contact the flow control body upon engagement of the sealing device with the flow control body, the primary engagement feature having a front surface exposed to the fluid, and a secondary engagement feature disposed behind the primary engagement feature relative to the exposed surface, the primary engagement feature and the secondary engagement feature forming a cavity therebetween, the cavity configured to create a pressure drop in response to a leak of the fluid through the primary engagement feature.

Embodiment 2

The sealing assembly as in any prior embodiment, wherein the primary engagement feature and the secondary engagement feature contact the body upon engagement of the sealing device with the flow control body.

Embodiment 3

The sealing assembly as in any prior embodiment, wherein the secondary engagement feature forms a gap between the secondary engagement feature upon engagement of the sealing device with the flow control body.

Embodiment 4

The sealing assembly as in any prior embodiment wherein the gap has a thickness selected so that the secondary engagement feature contacts the body in response to deformation of the primary engagement feature.

Embodiment 5

The sealing assembly as in any prior embodiment, wherein the primary engagement feature includes a coating configured to contact the flow control body and upon engagement of the sealing device with the flow control body, and the gap has a thickness selected so that the secondary engagement feature contacts the body in response to removal of the coating.

Embodiment 6

The sealing assembly as in any prior embodiment, further comprising at third engagement feature disposed behind the second engagement feature, the third engagement feature forming a second cavity.

Embodiment 7

The sealing assembly as in any prior embodiment, wherein the first cavity and the second cavity have different volumes.

Embodiment 8

The sealing assembly as in any prior embodiment, wherein the primary engagement feature is configured to withstand a higher contact stress than the secondary engagement feature.

Embodiment 9

The sealing assembly as in any prior embodiment, wherein the sealing device and the flow control body form at least part of a fluid injection valve.

Embodiment 10

The sealing assembly as in any prior embodiment, wherein the primary engagement feature is configured as a seat that provides a mechanical stop to the flow control body.

Embodiment 11

A method of controlling flow of a fluid via a sealing assembly, the method including engaging a flow control body of a sealing assembly with a sealing device of the sealing assembly to prevent fluid flow through the sealing assembly, the sealing device including a primary engagement feature configured to contact the flow control body upon engagement of the sealing device with the flow control body, the primary engagement feature having a front surface exposed to the fluid, the sealing device including a secondary engagement feature disposed behind the primary engagement feature relative to the exposed surface, the primary engagement feature and the secondary engagement feature forming a cavity therebetween injecting a fluid into a component and preventing flow of the fluid through the sealing assembly by the primary engagement feature, the fluid applying an external pressure to the primary engagement feature and based on a leak of the fluid through the primary engagement feature into the cavity, causing a reduction of fluid pressure in the cavity relative to the external pressure.

Embodiment 12

The method as in any prior embodiment, wherein engaging the flow control body with the sealing device includes contacting the primary engagement feature and the secondary engagement feature with the flow control body.

Embodiment 13

The method as in any prior embodiment, wherein the secondary engagement feature forms a gap between the secondary engagement feature upon engagement of the sealing device with the flow control body.

Embodiment 14

The method as in any prior embodiment, wherein the gap has a thickness selected so that the secondary engagement feature contacts the body in response to deformation of the primary engagement feature.

Embodiment 15

The method as in any prior embodiment, wherein the primary engagement feature includes a coating configured to contact the flow control body and upon engagement of the sealing device with the flow control body, and the gap has a thickness selected so that the secondary engagement feature contacts the body in response to removal of the coating.

Embodiment 16

The method as in any prior embodiment, wherein the sealing device further includes at third engagement feature disposed behind the second engagement feature, the third engagement feature forming a second cavity.

Embodiment 17

The method as in any prior embodiment wherein the first cavity and the second cavity have different volumes.

Embodiment 18

The method as in any prior embodiment wherein the primary engagement feature is configured to withstand a higher contact stress than the secondary engagement feature.

Embodiment 19

The method as in any prior embodiment, wherein the sealing device and the flow control body form at least part of a fluid injection valve.

Embodiment 20

The method as in any prior embodiment wherein the primary engagement feature is configured as a seat that provides a mechanical stop to the flow control body.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A sealing assembly comprising:
   a flow control body; and
   a sealing device configured to engage the flow control body to prevent fluid flow through the sealing assembly, the sealing device including:
   a primary engagement feature configured to contact the flow control body upon engagement of the sealing device with the flow control body, the primary engagement feature having a front surface exposed to the fluid;
   a secondary engagement feature disposed behind the primary engagement feature relative to the exposed surface, the primary engagement feature and the secondary engagement feature forming a first cavity therebetween, the first cavity configured to create a pressure drop in response to a leak of the fluid through the primary engagement feature; and
   a third engagement feature disposed behind the secondary engagement feature, the third engagement feature forming a second cavity successive to the first cavity, wherein the first cavity and the second cavity have different volumes.

2. The sealing assembly of claim 1, wherein the primary engagement feature and the secondary engagement feature contact the body upon engagement of the sealing device with the flow control body.

3. The sealing assembly of claim 1, wherein the secondary engagement feature forms a gap between the secondary engagement feature and the flow control body upon engagement of the sealing device with the flow control body.

4. The sealing assembly of claim 3, wherein the gap has a thickness selected so that the secondary engagement feature contacts the body in response to deformation of the primary engagement feature.

5. The sealing assembly of claim 3, wherein the primary engagement feature includes a coating configured to contact the flow control body and upon engagement of the sealing device with the flow control body, and the gap has a thickness selected so that the secondary engagement feature contacts the body in response to removal of the coating.

6. The sealing assembly of claim 1, wherein the first cavity and the second cavity are successive cavities having successively larger volumes.

7. The sealing assembly of claim 1, wherein the primary engagement feature is configured to withstand a higher contact stress than the secondary engagement feature.

8. The sealing assembly of claim 1, wherein the sealing device and the flow control body form at least part of a fluid injection valve.

9. The sealing assembly of claim 1, wherein the primary engagement feature is configured as a seat that provides a mechanical stop to the flow control body.

10. A method of controlling flow of a fluid via a sealing assembly, the method comprising:
  engaging a flow control body of the sealing assembly with a sealing device of the sealing assembly to prevent fluid flow through the sealing assembly, the sealing device including a primary engagement feature configured to contact the flow control body upon engagement of the sealing device with the flow control body, the primary engagement feature having a front surface exposed to the fluid, the sealing device including a secondary engagement feature disposed behind the primary engagement feature relative to the exposed surface, the primary engagement feature and the secondary engagement feature forming a first cavity therebetween, the sealing device further including a third engagement feature disposed behind the secondary engagement feature, the third engagement feature forming a second cavity successive to the first cavity, wherein the first cavity and the second cavity have different volumes;
  injecting the fluid into a component and preventing flow of the fluid through the sealing assembly by the primary engagement feature, the fluid applying an external pressure to the primary engagement feature; and
  based on a leak of the fluid through the primary engagement feature into at least one of the first cavity and the second cavity, causing a reduction of fluid pressure in at least one of the first cavity and the second cavity relative to the external pressure.

11. The method of claim 10, wherein engaging the flow control body with the sealing device includes contacting the primary engagement feature and the secondary engagement feature with the flow control body.

12. The method of claim 10, wherein the secondary engagement feature forms a gap between the secondary engagement feature and the flow control body upon engagement of the sealing device with the flow control body.

13. The method of claim 12, wherein the gap has a thickness selected so that the secondary engagement feature contacts the body in response to deformation of the primary engagement feature.

14. The method of claim 12, wherein the primary engagement feature includes a coating configured to contact the flow control body and upon engagement of the sealing device with the flow control body, and the gap has a thickness selected so that the secondary engagement feature contacts the body in response to removal of the coating.

15. The method of claim 10, wherein the first cavity and the second cavity are successive cavities having successively larger volumes.

16. The method of claim 10, wherein the primary engagement feature is configured to withstand a higher contact stress than the secondary engagement feature.

17. The method of claim 10, wherein the sealing device and the flow control body form at least part of a fluid injection valve.

18. The method of claim 10, wherein the primary engagement feature is configured as a seat that provides a mechanical stop to the flow control body.

* * * * *